Feb. 25, 1936.  E. BENSHIMOL  2,031,920
GEOMETRIC TOOL
Filed Sept. 26, 1934
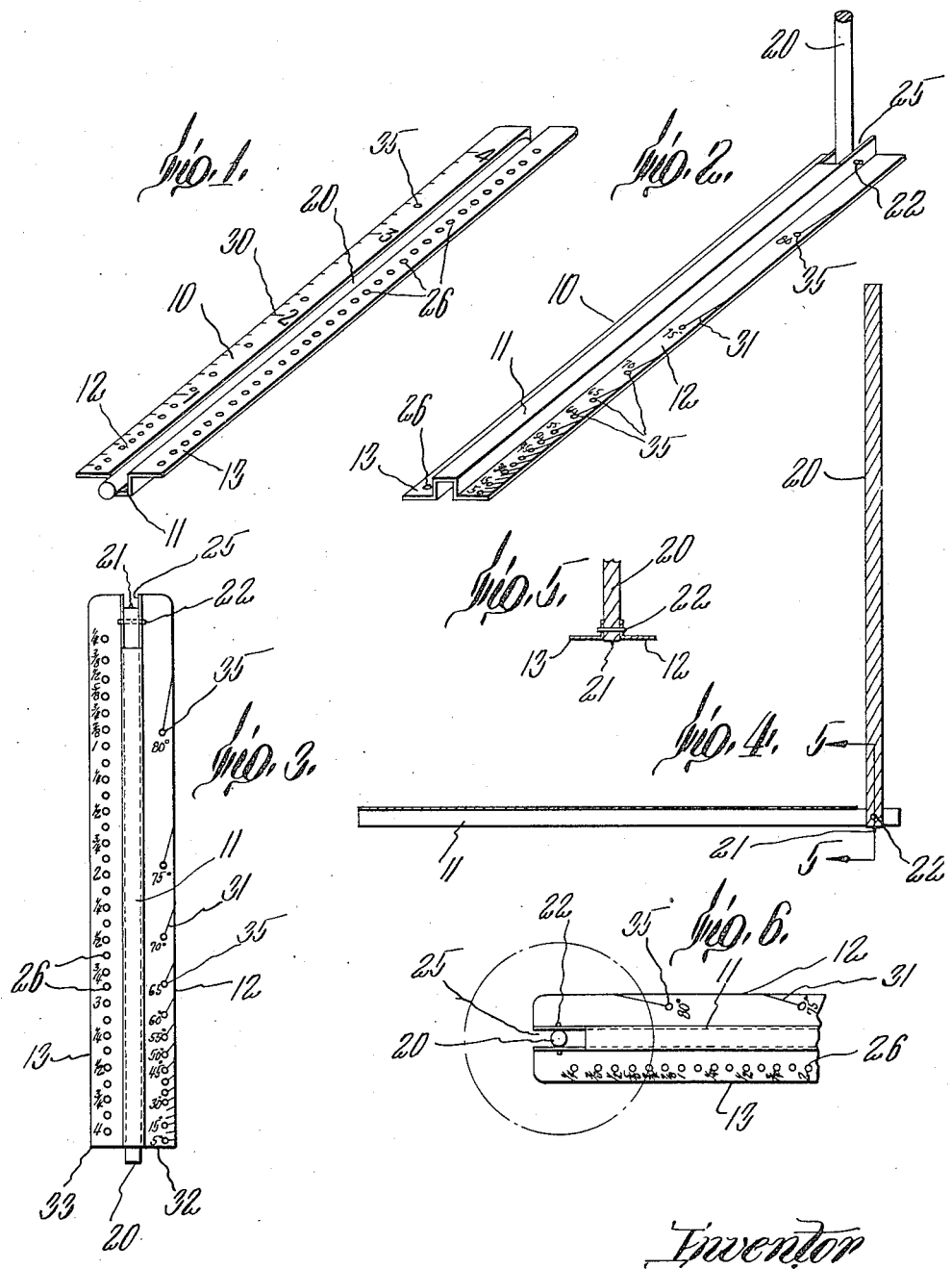

Patented Feb. 25, 1936

2,031,920

UNITED STATES PATENT OFFICE 2,031,920

GEOMETRIC TOOL

Ernest Benshimol, Arlington, Mass.,

Application September 26, 1934, Serial No. 745,519

3 Claims. (Cl. 33—27)

This invention relates to a geometric tool which is adapted for various uses and is designed particularly for use in schools and similar institutions. An object of the invention is to provide compasses of simple construction which can be easily carried in the pocket and which are readily usable to draw circles of different diameters within the range of action thereof. It is also an object of the invention to combine with the compasses a simple protractor for laying off or measuring angles.

Various advantageous features of structure will be apparent from the description of the invention which follows and from the illustration of an embodiment thereof on the drawing of which Figure 1 is a perspective view of an instrument embodying the invention.

Figure 2 is a perspective view of the same opened out for use.

Figure 3 is a plan view of the instrument in its folded condition.

Figure 4 is a sectional view of the instrument in its open position.

Figure 5 is a fragmentary section on the line 5—5 of Figure 4.

Figure 6 is a fragmentary plan view of the instrument when in position for use.

Figure 1 illustrates a compass embodying the invention, this compass comprising a member 10 having a channeled portion 11 which may have one or two longitudinally extending flanges 12 and 13, these flanges being shown in a common plane. A rod or spindle 20 is provided, this spindle having a sharp point such as a pin 21 projecting axially at one end thereof. The spindle is pivotally attached to the member 10 as by a suitable pin 22 which is adjacent to the point bearing end of the spindle and which forms a pair of trunnions journaled in the side walls of the channel portion 11 near one end thereof. The bottom of the channel member 11 is cut away as at 25 for a sufficient distance from the end of the channel to permit the point 21 to swing through the opening thus made. This permits the spindle 20 to be swung from the position shown in Figure 1 to the position shown in Figures 2 and 4, a swing of 270° being necessary to move the spindle from one position to the other. In using the compass for drawing circles, the spindle 20 is moved to an upright position as shown in Figures 2 and 4, the member 10 being placed on the surface on which the circle is to be drawn so that the flanges 12 and 13 rest directly on the surface. At any convenient points in the member 10, such as in the flange 13, a series of small holes 26 are provided, each of these holes being of a convenient size to receive the point of a sharpened lead pencil. These holes may conveniently be spaced apart by uniform distances of ⅛ of an inch, for example, so that circles of an even number of quarter inches may be drawn. When the compass is in the position shown in Figure 2 with the pin 21 projecting into the surface on which the circle is to be drawn, the point of a lead pencil may be inserted through a selected hole 26 and swung around the pin 21 as a center, thus describing a circle. If desired, the member 10 may be inverted so that the channel portion 11 bears on the surface when the circle is described. The instrument may also be used as a measuring rule by the provision of suitable scale divisions 30 on one of the flanges 12 or 13, such scale divisions being shown on a face of the flange 12 in Figure 1. The instrument may also be used as a protractor by placing scale divisions 31 on the face of one of the flanges, such scale marks being shown in Figures 2 and 3. These scale marks, as shown, are made with reference to an end edge 32 of the member 10, this edge being preferably at right angles to the side edges of the member 10. By placing the corner 33 of the member 10 at the apex of an angle and making the end edge 32 coincide with one side of the angle, the other side of the angle may be compared with the nearest scale mark 31 to measure the size of the angle. Instead of or in addition to the scale marks 31, I may provide perforations 35 to facilitate laying off angles of certain sizes. These perforations may also be used instead of the perforations 26 for describing circles.

It is evident that various modifications and changes may be made in details of the structure of the compass illustrated on the drawing without departing from the spirit or scope of the invention as defined in the following claims.

I claim:—

1. A geometrical tool comprising a rod having a pointed end, a channel member adapted to receive said rod, and means pivotally connecting said rod and member whereby said rod may be swung to positions at right angles to said member, said member having a series of perforations to receive the point of a lead pencil or the like for describing circles with said pointed end as a center.

2. A geometrical tool comprising a rod, a pointed pin projecting axially from an end of said rod, a channel member adapted to receive said rod and pin in the channel thereof, and means adjacent to an end of said rod and said member for pivotally connecting said rod and said member whereby said rod can be swung to positions at right angles to said member, said member having a longitudinal flange with a series of perforations adapted to receive the point of a marking tool.

3. A geometrical tool comprising an elongated plate bent to form a central longitudinal channel, a rod adapted to lie in said channel, a pointed element projecting axially from an end of said rod, trunnions on said rod near the pointed end thereof journaled in the sides of said channel near an end thereof, the bottom of the channel being cut away from said end for a distance sufficient to permit the pointed end of the rod to clear the bottom of the channel when the rod is swung through an angle of over 180° from its position of rest in said channel, said plate having a series of perforations adapted to receive the point of a lead pencil or the like.

ERNEST BENSHIMOL.